(12) United States Patent
Hund et al.

(10) Patent No.: US 7,934,417 B2
(45) Date of Patent: May 3, 2011

(54) SCANNING PROBE MICROSCOPE

(75) Inventors: Markus Hund, Bayreuth (DE); Hans Herold, Bayreuth (DE)

(73) Assignee: Markus Hund, Bayreuth (DE)

( * ) Notice: Subject to any disclaimer, the term of this patent is extended or adjusted under 35 U.S.C. 154(b) by 830 days.

(21) Appl. No.: 10/598,045

(22) PCT Filed: Feb. 14, 2005

(86) PCT No.: PCT/EP2005/001456
§ 371 (c)(1),
(2), (4) Date: Oct. 24, 2007

(87) PCT Pub. No.: WO2005/083717
PCT Pub. Date: Sep. 9, 2005

(65) Prior Publication Data
US 2008/0229812 A1    Sep. 25, 2008

(30) Foreign Application Priority Data

Feb. 20, 2004  (DE) .......................... 10 2004 008 852
Aug. 19, 2004  (DE) .......................... 10 2004 040 188
Sep. 3, 2004   (DE) .......................... 10 2004 043 191

(51) Int. Cl.
G01B 5/28     (2006.01)
(52) U.S. Cl. ........................................................ 73/105
(58) Field of Classification Search ...................... 73/105
See application file for complete search history.

(56) References Cited

U.S. PATENT DOCUMENTS

| | | | |
|---|---|---|---|
| 6,546,788 B2 * | 4/2003 | Magerle | 73/105 |
| 6,862,921 B2 * | 3/2005 | Chand et al. | 73/105 |
| 7,302,832 B2 * | 12/2007 | Berlin et al. | 73/105 |
| 2001/0052257 A1 | 12/2001 | Magerle | |
| 2005/0009197 A1 * | 1/2005 | Adams et al. | 436/164 |

FOREIGN PATENT DOCUMENTS

| | | |
|---|---|---|
| EP | 0899561 A1 | 3/1999 |
| EP | 1276145 A2 | 1/2003 |

(Continued)

OTHER PUBLICATIONS

"A High-Pressure Scanning Tunneling Microscope," by E. Laegsgaard, L. Osterlund, P. Thostrup, P.B. Rasmussen, I. Stensgaard, and F. Besenbacher, Review of Scientific Instruments, American Institute of Physics, vol. 72, No. 9, pp. 3537-3542, published Sep. 2001.

(Continued)

*Primary Examiner* — Hezron Williams
*Assistant Examiner* — Rodney T Frank
(74) *Attorney, Agent, or Firm* — Workman Nydegger

(57) ABSTRACT

Implementations of the present invention relate to a scanning probe microscope, which includes a base frame to which a probe holder with a probe as well as a probe support are, or can be fixed. The probe and the sample mount can be moved relative to one another in order to obtain information about the surface of the sample by scanning a sample which is arranged on the sample mount. Furthermore, a reaction chamber can be attached to the base frame of the scanning probe microscope, with the sample mount arranged therein. The reaction chamber has an opening on its side facing the probe, through which the probe can enter the reaction chamber. The reaction chamber can enable treatment of the sample's surface by the specific influence of fluids within the reaction chamber when the reaction chamber is closed.

19 Claims, 5 Drawing Sheets

FOREIGN PATENT DOCUMENTS

| GB | 2123375 | 2/1984 |
|---|---|---|
| WO | WO 00/39569 A1 | 7/2000 |

OTHER PUBLICATIONS

"A New and Sophisticated Electrochemical Scanning Tunneling Microscope Design for the Investigation of Potentiodynamic Processes," by M. Wilms, M. Kruft, G. Bermes, and K. Wandelt, Review of Scientific Instruments, American Institute of Physics, vol. 70, No. 9, pp. 3641-3650, published Sep. 1999.

"A Compact Ultrahigh-Vacuum System for the in situ Investigation of III/V Semiconductor Surfaces," by Peter Geng, Juan Marquez, Lutz Geelhaar, Jutta Platen, Carsten Setzer, and Karl Jacobi, Review of Scientific Instruments, American Institute of Physics, vol. 71, No. 2, pp. 504-508, published Feb. 2000.

"Ultrahigh Vacuum Instrument that Combines Variable-Temperature Scanning Tunneling Microscopy with Fourier Transform Infrared Reflection-Absorption Spectroscopy for studies of Chemical Reactions at Surfaces," by David Beck, Matthias Batzill, Christof Baur, Jooho Kim, and Bruce E Koel, Review of Scientific Instruments, American Institute of Physics, vol. 73, No. 3, pp. 1267-1272, published Mar. 2002.

\* cited by examiner

Coil, Mechanical Design

Input Coil  Resonant Circuit Coil

RF Power
max. 25 W
27.12 MHz

Resonant Circuit Capacitor

SCANNING PROBE MICROSCOPE

BACKGROUND OF THE INVENTION

1. Field of the Invention

The present invention relates to a scanning probe microscope with advanced capabilities for sample treatment, and in particular to the improvement of scanning probe microscopes and related apparatuses which, for example, combine scanning probe technology with (stylus) profilometry (for example the DEKTAK 8 ADVANCED DEVELOPMENT PROFILER, model from the VEECO Company) and in this case referred to in the following text as scanning probe microscopes.

2. Background and Relevant Art

A scanning probe microscope comprising a base frame or a base mount to which a probe holder with a probe and a sample mount are attached or can be attached, in which case the probe and sample mount can be moved relative to one another. Information about the surface of a sample which is arranged on the sample mount is obtained by scanning the sample. Scanning probe microscopes such as these are prior art and represent an important key technology in research and development. Many fields of science and industry are profiting from scanning probe microscopy, such as the semiconductor industry, the material sciences, biotechnology and polymer research.

The object of the present invention is to provide a scanning probe microscope as well as a corresponding method, in which the investigation options are also extended and their handling is made considerably easier.

Owing to the high spatial resolution, scanning probe microscopes can be used specifically to investigate very small surfaces. It is normally regarded as being advantageous, in particular in scanning atomic force microscopy (AFM), that no sample preparation, or only a very small amount of sample preparation, is required for the investigation, and the investigations can normally be carried out in ambient conditions. However, specific, repeated and economic influences on samples open up new investigation options in scanning probe microscopy and related apparatuses and methods, allowing the study of influences on sample treatment using data before and after the sample treatment. For example, the destructive spatial imaging method of nanotomography (WO 00/39569) is based on the sequential removal of sample material at a specific point on the sample surface. Unfortunately, however, a number of serious and general technical problems and obstructions exist in the use and in the economical implementation of methods in general which are based on the treatment of a specific sample surface and scanning probe microscopy. If, by way of example, the sample is subjected to a low pressure plasma treatment outside the scanning probe microscope ('ex situ'), the sample must be repositioned. After installation in the scanning probe microscope, the small sample surface of interest must be found. Various methods and recipes for finding the sample surface of interest (spot) are known in scanning probe microscopy. These generally use so called characteristic landmarks, such as defects in the material or applied scratches, for positioning of the probe and of the sample. However, the known methods are unsuitable for widespread use of these methods since they are time consuming and costly, tedious, uncertain and susceptible to errors, and the problem of finding the same sample spot cannot be solved. This problem impedes widespread economical use and the effective use of methods which are based on the repeated scanning of a specific sample surface.

In situ investigations in the field of scanning probe microscopy in an ultrahigh vacuum (UHV) are known and are prior art (for example P. Geng et al, Rev. Sci. Instrum. 71, 504 508, 2000). These methods and apparatuses are technically complex since they are based on UHV technology. The handling of samples and probes, in particular the process of exchanging samples and probes, is more difficult than with scanning probe microscopes which operate under ambient conditions. In particular, the nature of the sample treatment is restricted and the problem exists that the probe is normally also subject to treatment.

BRIEF SUMMARY OF THE INVENTION

One core idea of the present invention is now to provide a reaction chamber on the scanning probe microscope, within which the sample can be influenced in a desired manner, with previous and/or subsequent scanning processes being carried out on the surface of the sample by means of the probe within the reaction chamber, and with the reaction chamber for this purpose having an opening on its side facing the probe, through which the probe can enter the reaction chamber.

In this case, the sample in the reaction chamber which can be integrated in the scanning probe microscope can be influenced in many different ways. For example, it is feasible to remove material layer-by-layer from the sample, in particular from its surface. However, alternatively it is also feasible to allow material to be grown in layers on a sample or on a base structure, in which case scanning processes can be carried out at any desired intervals in order to determine the surface characteristics of the respectively achieved structure. Instead of growing or removal, the characteristics of the sample or of the sample surface can also be changed specifically in various ways within the reaction chamber, with these changes being tracked at intervals by probing with scanning probe microscope. The sample can also be treated (in situ) while being scanned by the scanning probe microscope, for example with gases, depending on the chosen type of sample treatment. The capability to separate the sample treatment and the investigation of the sample surface using a scanning probe microscope also allows the sample to be treated in ways which would otherwise change or destroy the probe, and would result in a disadvantageous influence on the investigation with a scanning probe microscope. By way of example, it is possible to use aggressive etching liquids such as acids. The sample can also be treated by an electromagnetic, electrical and/or magnetic field.

Primarily, the reaction chamber may have a cylindrical basic geometry. However, other basic shapes, in particular rotationally symmetrical shapes, such as an ellipsoid or a spherical shape are also feasible, in which case an opening of a sufficiently large size for the probe to enter must always be provided on the upper face.

The capability for relative movement between the probe and the sample mount can be achieved by the probe being held firmly on an investigation plane (x and y directions) and by the sample mount being moved with the aid of a sample table which can be moved on the investigation plane (x and y directions). Alternatively, the sample mount can also be held in a fixed position and the capability for relative movement can be achieved solely by movement of the probe. It is also feasible to design both the probe and the sample mount such that they are not in a fixed position with respect to the base frame of the scanning probe microscope but can both be moved and/or adjusted.

The capability for relative movement between the probe and the sample mount is provided by means of suitable nanopositioning devices and/or scanning devices, such as piezo tubes and/or special scanning units for quantitative scanning probe microscopy according to the prior art. The scanning unit (scanner) in the case of commercially available scanning probe microscopes is generally coupled to a micropositioning device, for example to a motorized linear table in order first of all to move the probe roughly close to the sample surface in the z direction (for example DIMENSION 3100 model from the VEECO Company). Moveable measurement tables (xy stage) are used for rough positioning of the sample and are expediently on air bearings in order to allow movement with as little friction as possible. During the movement toward the sample, which is often carried out completely or partially automatically, the air bearing table is fixed firmly on the base plate by means of vacuum, and remains fixed until the probe is pulled back or until the next rough movement. In the case of microscopes which operate, for example, in combination with an optically inverted microscope (for example the MFP 3-D model from the ASYLUM RESEARCH company), the scanning unit is formed by an xyz sample scanning table (stage) on which the sample is scanned. Scanners such as these generally have an opening (aperture) and are positioned on an xy measurement table which is used for positioning in the micrometer range (or in some cases in the sub micrometer range).

As a result of specific design characteristics, for example with the sample holder having a small physical height, scanning probe microscopes are enormously mechanical rigidity in particular in the z direction, thus, among others, allowing high resolution in the z direction. The measurement table, which can be moved with respect to a base plate that is arranged on the base frame, can expediently be designed as an air bearing table for rough positioning of the sample, although the air bearing table is fixed by means of an external vacuum pump throughout the entire data acquisition process.

According to one particular aspect of the present invention, it is possible to use conventional movable measurement tables (xy stages) or specific parts of the measurement table system. By way of example, scanning probe microscopes may be equipped with sample holders which are in the form of a vacuum chuck comprising a chuck base (air bearing table) and a chuck plate (for example the DIMENSION 3100 scanning probe microscope model, VEECO Company). Chucks such as these are described for example in GB 21 22375 A and in EP 1276145 A2 and are used for holding planar specimens, such as wafers. According to the advantageous aspect of the present invention, the complete chuck arrangement in a conventional scanning probe microscope can be removed from the measurement table (xy stage) and may be replaced by a reaction chamber module according to the invention comprising a reaction chamber base body in which the reaction chamber itself is also arranged. This results in a reaction chamber module which is also suitable for retrofitting of conventional scanning probe microscopes which have chucks or other microscope tables according to the prior art. The reaction chamber module may be formed in its entirety from metal, in particular from aluminum or stainless steel. Alternatively, the reaction chamber base body may be formed from metal, in particular from brass, with the reaction chamber itself being formed from glass or glass ceramic. As a further alternative, it is also possible for the entire reaction chamber module comprising the reaction chamber base body and the reaction chamber to be produced in its entirety from glass ceramic.

The measurement table with the reaction chamber module comprising the reaction chamber and the reaction chamber base body can also be manufactured from a monolithic glass ceramic block, forming an integral unit.

It is self evident that other variants for positioning or movement of the reaction chamber according to the invention can also be provided without making use of conventional measurement tables (xy stages) and, for example, the reaction chamber can be attached by means of clamping apparatuses, with scanning being carried exclusively by movement of the probe.

In one preferred development of the present invention a closure device, in particular a cover plate or a cover, is provided in order to make it possible to close the opening after the probe has been moved from a measurement position $P_M$ to a withdrawn sample preparation position $P_V$.

Although, in many applications, the sample within the reactor chamber can be sufficiently treated with an open reactor chamber, it appears in the end to be desirable to close the reactor chamber, at least in the case of need. For this purpose, a closure device in the form of a cover plate or a cover can be pushed over the opening whereas the movement can be in particular translational or rotational.

According to one particularly preferred aspect of the present invention, the probe and the reaction chamber can be arranged with respect to one another in such a manner that the withdrawn sample preparation position $P_V$ can be reached, starting from preferably any desired measurement position, by movement of the probe and/or sample exclusively in the z direction (perpendicular to the surface), which is orthogonal with respect to the x and y directions.

This technical measure solves the problem of repositioning, or considerably reduces it. Since the sample and probe are separated only by movement through a short movement distance at right angles to the surface of the sample before the deliberate influence on the probe, this ensures that the original position is found relatively exactly again when the probe is moved toward the sample again, despite any possible drift of probe actuators and/or actuators for a sample table.

In one preferred refinement of the scanning probe microscope, the arrangement is designed such that the movement distance of the probe relative to the sample is between 1 mm and 15 mm, preferably between 1 mm and 6 mm, and in particular between 1 mm and 3 mm. In the case of a reaction chamber which cannot be closed, the movement distance is governed by how far the probe must be moved out of the area of the opening of the reaction chamber in order not itself to be subject to undesirable influences.

In the case of a reaction chamber on which a closure device is provided, the movement distance is governed by the thickness of a cover plate or of a cover, a safety separation between the cover plate or cover and the probe in the sample preparation position $P_V$, and the distance between the surface of the sample and the inner face of the cover plate or cover.

In one specific refinement, the reaction chamber also has at least one inlet, in order to introduce fluids, such as liquids, gases, particle flows and/or a plasma into the reaction chamber. The reaction chamber can thus be fed in a desired manner with fluid media, such as liquids, gases and/or a plasma, in order to produce a desired change on the sample.

In a further preferred refinement, in addition to the at least one inlet, an outlet is also provided which is operatively connected to a suction device in order to pass liquids, gases, particle flows and/or plasmas via the inlet through the reaction chamber. The suction device allows the fluid media to flow advantageously and allows good control of the fluid flow.

In one specific refinement, a plasma generation device can be arranged on or in the reaction chamber in order to allow a plasma to be produced within the reaction chamber. A plasma such as this may be used in particular in order to carry out a plasma etching process on the surface of the sample. In one specific development, the plasma generation device is designed to produce a plasma by inductive means.

In one preferred refinement, the plasma generation device has a flat coil, in which all of the windings are arranged essentially on one plane, and a capacitor, which is formed radially symmetrically or in a planar form.

In a further refinement to the present invention, at least two electrodes of opposite polarity are provided on the reaction chamber, in order to input energy capacitively. This may be done, for example, for a Reactive Ion Etching (RIE) process, which is used in particular in the semiconductor industry. The capacitive input of energy can be carried out on its own or in combination with additional influences on the sample, for example by energy additionally being inputed by means of microwaves. A downstream plasma etching effect can be achieved by inserting a perforated shielding electrode into the reaction chamber underneath the sample. The outlet is then moved as far upwards as possible (in the direction of the sample).

According to one preferred aspect of the present invention, the reaction chamber has a volume of between 1 cm$^3$ and 10 cm$^3$, preferably of between 2 cm$^3$ and 5 cm$^3$ for typical sample sizes and sample areas. The volume for larger sample areas of 40 mm×40 mm is preferably about 300 cm$^3$.

In order to allow the sample to be grounded or to be fixed at a desired electrical potential, a conductor is passed into the reaction chamber, or can be passed into the reaction chamber, in order to make contact with the sample.

According to a further advantageous aspect of the present invention, the reaction chamber may also have a sample heating and/or sample cooling apparatus. A sample heating apparatus within the reaction chamber may, for example, be in the form of a heatable miniaturized platinum microheating element, or a commercially available cartridge heater. A heating and/or cooling element may also be formed by a Peltier element.

The temperature of the sample in an embodiment such as this is adjustable. Miniaturized sample heating apparatuses which, for example, are equipped with an integrated temperature sensor are prior art (for example NANOSCOPE HEATERSYSTEM, Model HS-1, VEECO Company). These may entirely or partially replace the sample mount. Alternatively, for example, a platinum microheater or some other heater can be integrated in the sample mount.

A reaction chamber module for installation in a scanning probe microscope according to the invention is also claimed independently as a unit which is significant to the invention.

A reaction chamber module with a suitable measurement table for installation in a scanning probe microscope, in particular scanning probe microscopes, which allows to control the environmental conditions, such as humidity and other parameters, is also regarded as a unit which is significant to the invention (for example the ENVIROSCOPE scanning probe microscope model from the VEECO Company).

The method for treatment and investigation of surfaces of a sample with the aid of a probe of a scanning probe microscope and of a reaction chamber which is installed in the scanning probe microscope comprises the following steps:

A first scanning probe investigation of an area of a surface of a sample which is arranged in an open reaction chamber is carried out, the probe is withdrawn in a direction perpendicular to the surface, through a defined movement distance S from its measurement position $P_M$ to a sample preparation position $P_V$, the surface within the reaction chamber is treated by the specific influence of a liquid, of a gas, of a particle flow and/or of a plasma over a predetermined reaction time, the probe is moved back from the sample preparation position $P_V$ to the previous measurement position $P_M$ or to a new initial position $P_A$ in the in direct vicinity of the previous measurement position.

In this case, according to the invention, it is irrelevant whether a first scanning probe investigation of an area of the surface of the sample is carried out before the treatment of the sample in the reaction chamber or only after the treatment of the sample in the reaction chamber. In any case, the method according to one preferred aspect of the invention can be carried out iteratively, thus carrying out a successive sequence of sample treatment measurement sample treatment measurement etc. In this case, in particular, it is possible to trace layer removal or else layer growing.

In one expedient development of the present method, the relevant movement between the probe and the sample is carried out such that the previous measurement position $P_M$ and the new initial position $P_A$ are less than 600 nm apart from one another, preferably less than 200 nm apart from one another, and in particular less than 20 nm apart from one another.

In practical trials, it has been found that, in the case of a typical sample treatment by means of a low pressure plasma, the previous measurement position $P_M$ and the new initial position $P_A$ each increase by about 20 nm after each treatment step, preferably even increasing only in the nanometer range or sub nanometer range.

According to a further aspect of the present invention, the relative movement between the probe and the sample is carried out such that the previous measurement position $P_M$ and the initial position $P_A$ are less than 0.04 parts per thousand, preferably less than 0.004 part per thousand, in particular less than 0.0004 parts per thousand of the movement distance S, in which case the approximately constant increase in the distance for further treatment steps increases by less than about 0.0035 parts per thousand, preferably less than 0.00035 parts per thousand, in particular less than 0.000035 parts per thousand of the movement distance S per treatment step.

In one specific development, the method provides that before the treatment of the surface, the reaction chamber is closed, and it is opened again before the probe is moved back, in order to allow the probe to enter the reaction chamber.

On the basis of a further aspect of the method according to the invention, a plasma is ignited and operated in the volume of the reaction chamber or in an adjacent chamber with a comparably large volume, in particular in a volume of 1 cm$^3$ to 10 cm$^3$. This can be achieved, for example, by means of the already described flat coil as well as the planar and/or radially symmetrical capacitor.

In contrast, currently available plasma etching devices are designed for stationary operation and for large samples (for example a silicon wafer with a diameter of 6 inches) and high RF powers (typically: several 100 W). In contrast to the apparatuses and methods which are generally described for the requirements of the semiconductor industry, this provides apparatuses and methods for ignition and operation of small plasmas, as is particularly expedient for the present microscopic applications in this case.

The reaction chamber is optionally connected to a plasma monitoring system according to the prior art with the aid of an optical waveguide and a sensor. Systems such as these analyze the light emitted from the plasma. Since more power is required to ignite the small plasma, in particular, than for operation, and delay times can occur between the inputting of the power and the actual ignition of the plasma, the light pulse during ignition can be used in order to automatically switch to the operating power and to ensure defined treatment times. In addition, a plasma monitoring system can be used for event oriented, automated adaptation of the operating parameters, in particular the input power, and for fault diagnostic.

BRIEF DESCRIPTION OF THE DRAWINGS

Further features and advantages of the invention will also be explained in more detail in the following text using the description of exemplary embodiments and with reference to the attached drawings, in which.

DETAILED DESCRIPTION OF THE PREFERRED EMBODIMENTS

Figure 1:
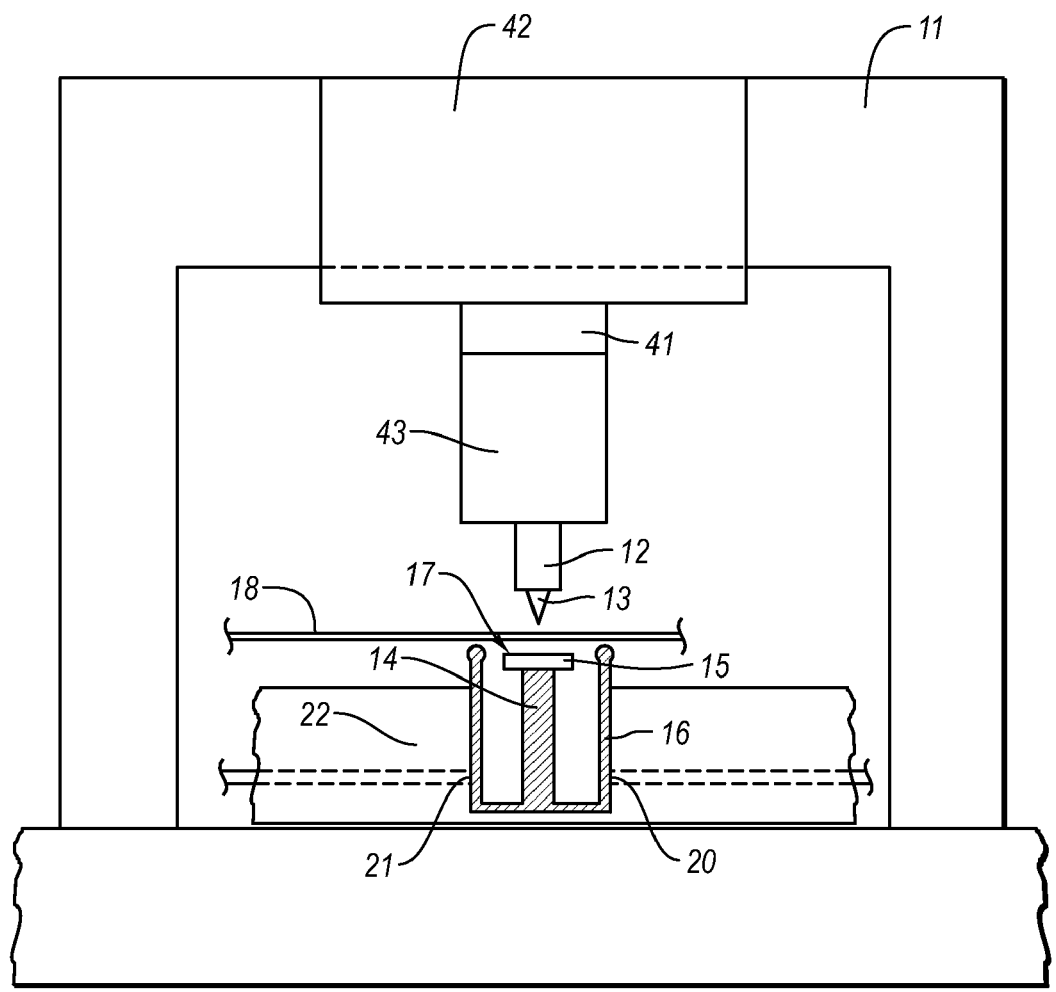
FIG. 1 shows a first embodiment of a scanning probe microscope with a reaction chamber in the form of a section sketch view.
Figure 2:
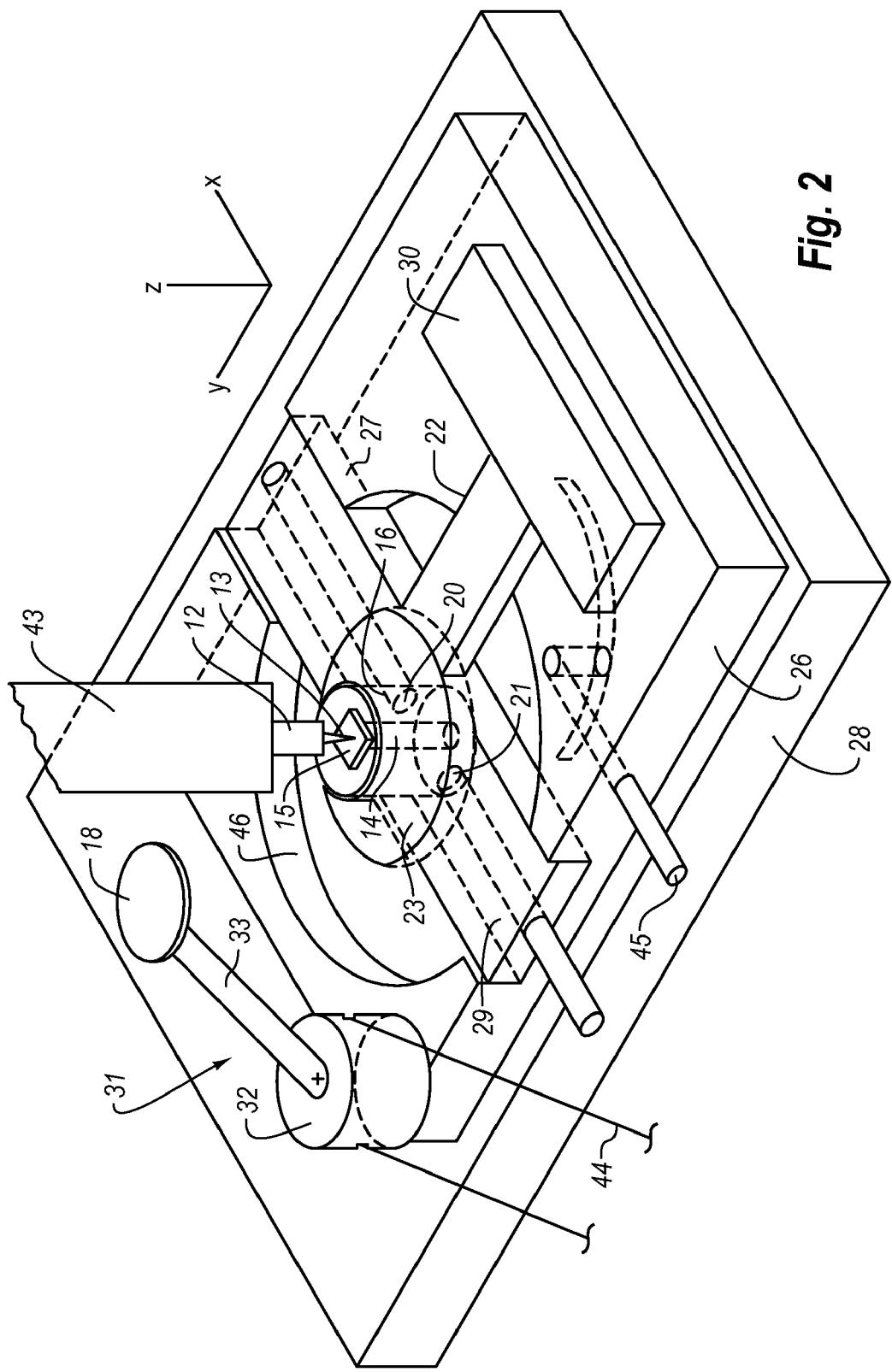
FIG. 2 shows a perspective outline view of a scanning probe microscope with a reaction chamber module comprising a reaction chamber and a reaction chamber base body.

FIG. 1 shows a schematic illustration of a base frame 11 as well as a probe holder 12 for a scanning probe microscope. Alternatively, a mount may be used instead of a base frame, to which mount a preferably moving cantilever arm can optionally be attached. A probe 13 is arranged on the probe holder 12. A reaction chamber module 29 (FIG. 2), which has a reaction chamber base body 27 as well as a reaction chamber 16, is arranged on the base frame 11 such that it can be moved on an investigation plane (xy plane), or is stationary. The reaction chamber base body 27 in FIG. 2 is in the form of an integral unit with the reaction chamber 16. Alternatively or additionally, a micropositioning device 42 for rough positioning is in this case provided between the probe holder 12 and the base frame 11. A scanning unit 43 is also provided between the micropositioning device 42 and the probe holder 12, in order to allow the sample to be scanned. In addition, an actuator 41 can also be provided between this scanning unit 43 and the micropositioning device 42, and may, for example, be in the form of a piezoactuator, piezo-flexure stage or magnetic xy scanner, which can carry out relatively large movements in the z direction (up to a few millimeters) with a typical accuracy of a piezoelectric actuator system.

FIG. 2 shows a schematic perspective view of one embodiment of a scanning probe microscope according to the invention with a reaction chamber module 29. A movable measurement table 26 (xy stage) is arranged, in particular on air bearings, on a base plate 28 which is or can be connected to the base frame 11 (not shown), and is connected by a connection 45 to a vacuum or compressed air source. The measurement table 26 is preferably composed of brass, INVAR or an iron/nickel alloy with a low coefficient of thermal expansion. The measurement table 26 (xy stage) has actuators for movement in the xy direction (not shown). The reaction chamber module 29 which has already been mentioned is inserted into the movable measurement table 26, in this case has an essentially cuboid shape, and its dimensions can be matched to the dimensions of a chuck which can otherwise be inserted into the measurement table 26.

The scanning probe microscope according to the invention could optionally be equipped with an apparatus for automatic replacement of the probe according to the prior art (for example WO 97/08733 or EP 0847590).

A reaction chamber 16 may be accommodated in the reaction chamber base body 27 or, as in this case, forms an integral unit with it. The reaction chamber 16 in this case has a cylindrical wall composed of glass, in particular composed of glass ceramic which can be mechanically machined. A sample mount 14 is provided within the reaction chamber 16. The sample mount may in principle have any desired shape and may even be used as an electrode (not shown). However, it is preferably cylindrical and is composed of glass ceramic. It can be mounted separately within the cylindrical basic vessel of the reaction chamber, or may be formed integrally with it (see FIGS. 4a to 4g).

A plasma generation device 22 is arranged on the reaction chamber module 29 and the measurement table 26. In the simplest case, it essentially comprises a flat coil and a capacitor 30 (see FIG. 5a and FIG. 5b). The analog radiofrequency circuit may also be replaced by a miniaturized, preferably planar, radiofrequency-system which operates at frequencies in the microwave range (microwave integrated circuits).

A plasma can be produced in the reaction chamber 16 by means of the plasma generation device 22, in order to process the surface of a sample in a specific manner, in particular by the removal of layers.

In order to introduce a desired substance, in particular in order to produce a plasma, into the reaction chamber 16, it has an inlet 20. The substance can be emitted via an outlet 21, possibly in modified form, in particular after a plasma process and if appropriate together with the substance which has been removed from the sample.

In order to ensure that a substance, in particular a plasma, acts particularly intensively on the sample, the reaction chamber 16 can be closed by means of a cover plate 18, according to one particular aspect of the present invention. The cover plate closes the reaction chamber 16 as completely as possible, although a particularly sealed closure is not appropriate in the same manner for all reaction processes.

According to one significant major aspect of the present invention, the probe 13 which is attached to the probe holder 12 is, however, in fact moved back sufficiently from the reaction chamber 16 that the cover plate 18 can close the reaction chamber 16 without damaging the probe 13. If the cover plate 18 is in an appropriately slimline form and a safety separation between the cover plate and probe 13 that is not excessive large is chosen, then it is possible to achieve a relatively short movement distance in the direction for the probe 13. A short movement distance such as this results in the major advantage that the probe 13 can be reliably repositioned on the previously investigated area of the sample, and that any deviations in the repositioning are extremely small.

The repositioning process was conventionally subject to considerable effort, error sources and uncertainties. A large number of images had to be taken in different scale areas, in some cases additionally using optical microscopes, in order to subsequently make it possible to find the same spot again often after a lengthy search on the basis of the comparison of similar topography relationships or other signals. The present invention provides a simple remedy for this, specifically in that the movement distances are extremely short, so that any errors, drifts, etc which result from them are likewise extremely small.

The small errors mean that it may be possible to entirely dispense with any correction (manually or automatically), since, according to the prior art, high data densities are possible even for relatively large scanning areas, and details of interest are thus accessible without time consuming repeated scanning of relatively small scanned areas (magnification with the aid of software). Alternatively, scanning units according to the prior art allow simple correction by the operator, or automatically with the aid of software. This applies, of course, in particular to quantitative scanning probe microscopy. However, in general only a portion of the scanned area is of interest, so that, in many applications, there is no need for any corrections, or only after a specific number of sample treatments.

Large scanned areas for finding the spot are not only time consuming but they can also unnecessarily negatively influence, or even damage, the probe (for example by the accumulation of sample material). Consistent data sets with the use of a specific probe are also of interest. In particular, rotation/tilting of the sample is also greatly minimized with the aid of the invention.

The reaction chamber module 29 comprises the essentially cuboid reaction chamber base body 27 as well as an essentially cylindrical reaction chamber 16 arranged essentially at the center. The reaction chamber module 29 is attached to the measurement table 26 via a clamping apparatus (not shown). The reaction chamber base body 27 and the reaction chamber 16 preferably form an integral unit, composed of glass ceramic. The measurement table 26 may likewise form an integral unit with the reaction chamber module 29.

The size of the volume of the reaction chamber depends on the desired maximum sample size or sample area. According to one preferred aspect of the invention, the reaction chamber preferably has a volume from 1 $cm^3$ to 10 $cm^3$, preferably between 2 $cm^3$ and 5 $cm^3$, for samples with an area of about 6 mm☐6 mm. One advantage of the geometry shown in FIG. 1, in addition to the capability for flexible fitting of a plasma generation device, is the relatively large volume of the reaction chamber. Disturbance influences (state fluctuations) which can impede reproducible sample treatment, such as pressure changes, changes of flow or changes in the input power, then have less effect than when extremely small volumes are chosen. Preferred dimensions result for a cylindrical reactor geometry and samples with an area of 6 mm☐6 mm. A volume ratio of the volume located directly above the sample to the remaining volume of about 0.1 is achieved with a diameter of 18 mm and a cylinder height of 22 mm, with the distance between the sample surface and the inner face of the cover plate or of the cover of 2 mm. The ratio of the volume located directly above the sample to the sample area is about 14, while the ratio of the entire volume to the sample area is about 156. If relatively large samples are chosen with an area of about 40 mm☐40 mm, these ratios can be achieved by the choice of a larger diameter of about 120 mm.

The reaction chamber 16 can also advantageously be integrated in scanning units which have an opening (aperture) (xy or xyz scanners). For this purpose, the reaction chamber module 29 is adapted such that the reaction chamber preferably extends into the opening, in order to achieve small physical height, among others for good mechanical stability.

As already explained with reference to FIG. 1, the sample mount 14, on which a sample 15 is fixed, is arranged within the reaction chamber. The surface of the sample 15 can be scanned by means of the probe 13, which is held in the probe holder 12.

A closure device 31 is also arranged on the measurement table 26 and in this case specifically comprises an actuator 32 mounted such that it can rotate, a lever arm 33 as well as a cover plate 18, which has already been mentioned, in this case specifically in the form of a cover. The actuator 32 is positioned, and the lever arm 33 is of such a magnitude, that, on pivoting to a specific angle position, the cover plate 18 which is arranged on the lever arm 33 can be pivoted over the opening 17 in the reaction chamber 16, and in the process closes the reaction chamber 16. In this case, the actuator 32 can be operated, avoiding oscillations and with little static friction, by a circumferential thread 44 or by two threads 44 which are attached to the actuator. The closure device could also be operated by a vacuum, by compressed air, hydraulically or mechanically, in particular by means of a toothed belt or rubber belt or by means of a lamellar shutter or similar apparatuses with actuators which are in each case suitable for this purpose. In order to improve the seal between the reaction chamber and the cover plate 18, a seal such as an O ring (not shown) can be attached or fastened to the upper edge of the reaction chamber, or can be mounted in the cover plate or the cover.

The reaction chamber 16 is operatively connected to a plasma generation device 22, which specifically comprises the already mentioned flat coil 23 as well as a capacitor 30, in this case in a planar form. The measurement table 26 preferably has a cutout 46, which has a cylindrical shape in FIG. 2.

FIGS. 3a to 3e show various possible ways to input energy (the inlet and outlet are in each case not shown).

Figure 3A:
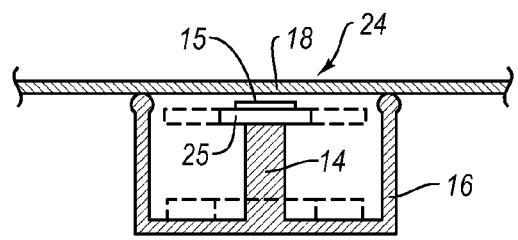
FIGS. 3a to 3e shows various embodiments of a reaction chamber with a cover plate.

FIG. 3a shows one preferred refinement for Reactive Ion Etching (RIE). In this case, the cover plate 18 is conductive and forms an electrode 24. An electrode 25 in the form of a plate can be formed as an opposing electrode at the upper end of the sample mount 14, on which opposing electrode the sample 15 is placed or attached (for example by means of a double faced adhesive tape). Dashed lines indicate that the electrode 25 may also be considerably larger or alternatively may also be provided at the bottom of the reaction chamber 16.

Figure 3B:
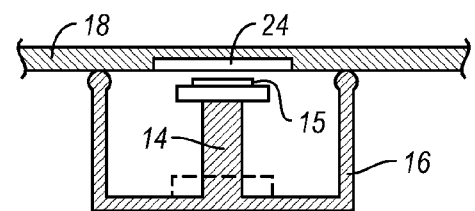

FIG. 3b shows a modified embodiment in which the electrode 24 is integrated in the cover plate 18 as a separate element. The electrode 25, which is in the form of the opposing electrode, can be arranged at the bottom of the reaction chamber 16, optionally within the reaction chamber 16 or outside the reaction chamber 16.

Figure 3C:
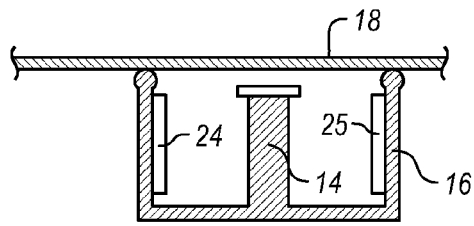

FIG. 3c shows an embodiment which has been modified again, in which the two electrodes 24, 25 are each arranged on the walls of the reaction chamber, but within the reaction chamber 16.

Figure 3D:
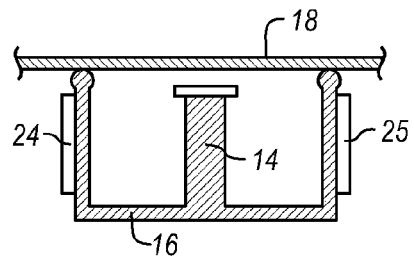

FIG. 3d shows an embodiment which has been modified once again, in which the electrodes 24, 25 are likewise attached to the walls of the reaction chamber 16, but on the outside of the walls of the reaction chamber 16.

Figure 3E:
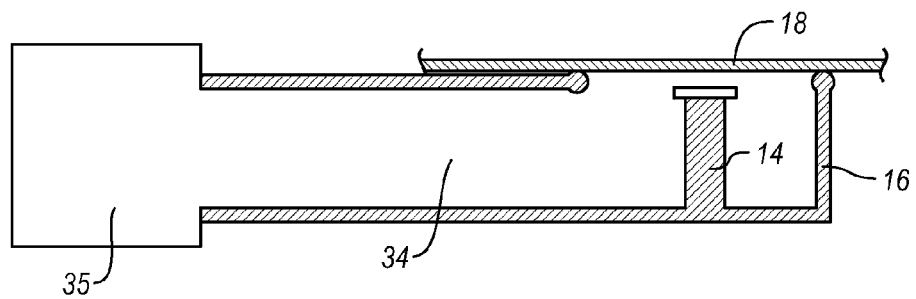

FIG. 3e shows one embodiment for injecting microwaves into the reaction chamber 16. For this purpose, a waveguide 34 is arranged at the side on the reaction chamber 16, and a microwave generation device 35 is connected to its opposite end. The microwaves which are produced by the microwave generation device 35 are passed via the waveguide 34 and optionally via a dielectric wall into the reaction chamber 16 (not shown).

Figure 4A:
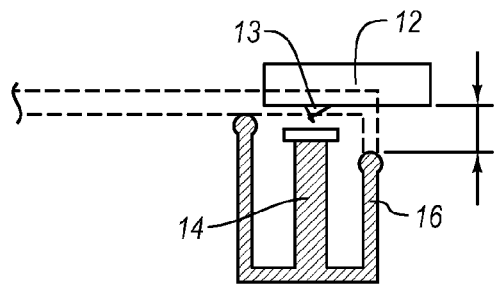
FIGS. 4a to 4g show various embodiments relating to the placing of a sample mount within a reaction chamber.

FIGS. 4a to 4g show various embodiments of the configuration of the reaction chamber and of the sample mount arranged in it, by way of example. FIG. 4a shows an embodiment in which the walls of the reaction chamber 16 are designed to be of different heights in the two opposite sides, thus making it easier for the probe holder 12 with the probe 13 to enter.

At the same time, a cover plate 18 is illustrated, which is specifically matched to this bevelled embodiment of the upper edge of the reaction chamber 16.

Figure 4B:
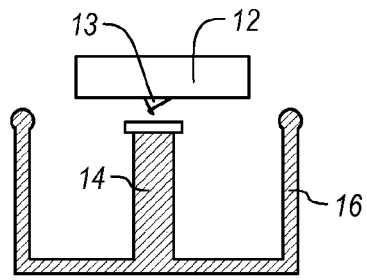

FIG. 4b shows an embodiment in which the reaction chamber 16 is designed to be appropriately wide, so that no problem of restricted entry depth occurs, since the probe holder 12 could itself enter the reaction chamber 16.

Figure 4C:
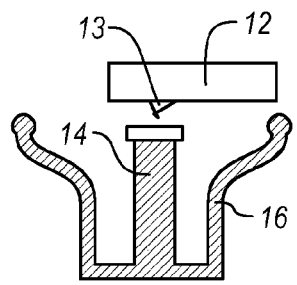
Figure 4D:
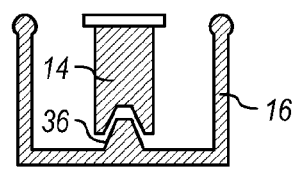

FIG. 4c shows an embodiment of a reaction chamber in which only the upper area of the reaction chamber has such a widened area which would allow entry of the probe holder 12. The cross section of the opening 17 in the reaction chamber 16 is thus larger than the cross section of the probe holder 12 in both of the embodiments shown in FIGS. 4b and 4c.

FIGS. 4d to 4g show various variants relating to the mounting of the sample mount 14 in the reaction chamber 16. In the embodiment shown in FIG. 4d, the sample mount, whose length is generally matched to the respective sample 15, is pushed onto a conical attachment 36 at the bottom of the reaction chamber 16, and is thus fixed.

Figure 4E:
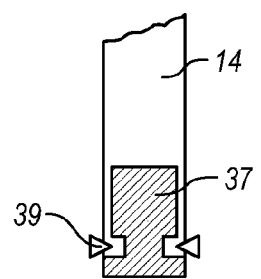
Figure 4F:
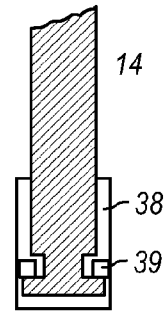

In the embodiments shown in FIGS. 4e and 4f, clamping devices 39 are provided which hold the sample mount 14, which has been placed onto a pin 37 (FIG. 4e), such that it is clamped, or hold the sample mount 14, which has been inserted into a collar 38 (FIG. 4f), such that it is clamped.

Figure 4G:
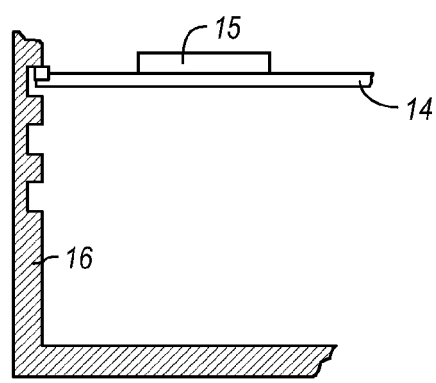

FIG. 4g shows another alternative embodiment, in which the sample mount 14 is attached to the walls of the reaction chamber 16 at the side. This could likewise be achieved in particular such that it is clamped, in which case the sample mount may, for example, be in the form of a plate and may be provided with cutouts. Alternatively, a web covering the cross section of the reaction chamber 16 could also be provided, and is attached to the walls of the reaction chamber 16 to provide a clamp (not shown).

Figure 5A:
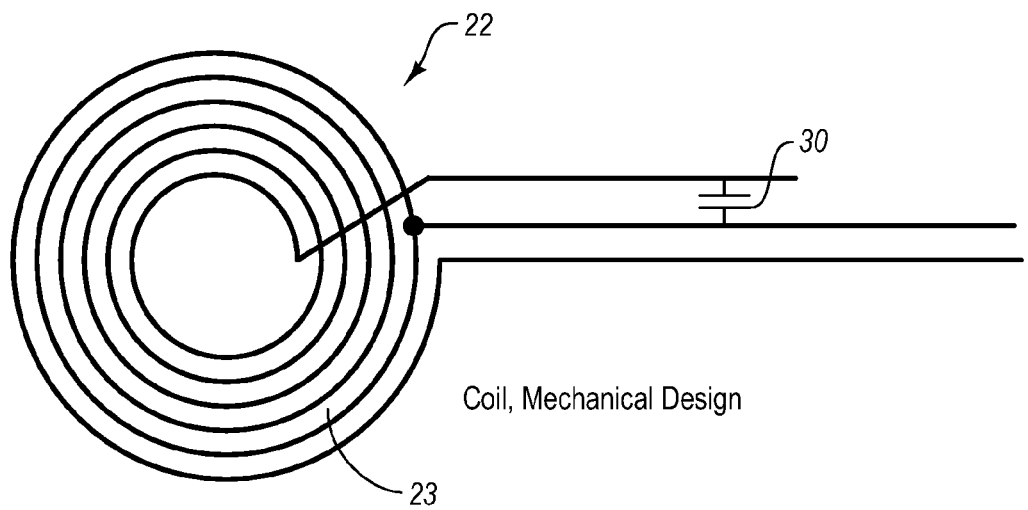
FIGS. 5a and 5b show one possible embodiment of a preferred plasma generation device.
Figure 5B:
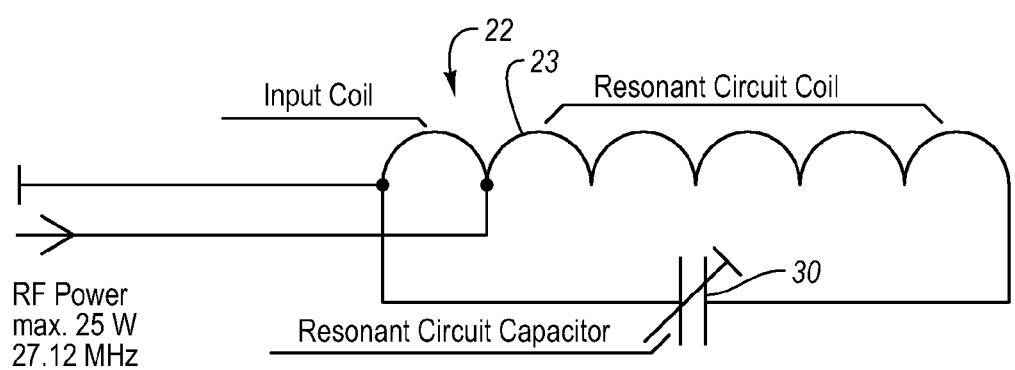

FIGS. 5a and 5b show one possible embodiment of a preferred plasma generation device having a flat coil 23. FIG. 5a shows the geometric design of the flat coil. FIG. 5b shows the circuit diagram, from which it can be seen that the first (outer) two coil windings act as an input coil, and the inner coils together with the planar or coaxial capacitor 30 form a resonant circuit. This plasma generation device may, of course, also be used independently of the use in a scanning probe microscope, and this is also regarded as being significant to the invention.

Distances from the original image center (error) of about 230 nm to 600 nm were achieved with a first prototype of one embodiment of the invention, with the aid of modified scanning probe microscope (DIMENSION 3100, VEECO Company) in a low pressure plasma treatment (process pressure: 1.5 mbar) on a sample (a thin polymer film) with a respectively selected movement distance of 6 mm of the probe 13 in the z direction over a total of 17 sample treatments. The distances increase at a typical rate of about 20 nm per treatment step. Furthermore, it has been found that the extremely small repositioning errors which occur with the configuration according to the present invention result in primarily directional drift, which could easily be compensated for by appropriate offsets of the scanning unit. In addition, the error can be calibrated, and can be compensated for automatically.

One advantageous further development relating to further significant reduction of the errors is not to use conventional linear tables (which, for example, are equipped with cross-roller bearings) for the movement of the probe or of the sample in the z direction, but to use a special actuator 41, in particular with a piezoactuator or with a piezo-flexure positioning apparatus, or with a special magnetic xy scanner (Vettiger et al, IBM J. Res. Dev. 44(3), 323 340, 2000 and Pantazi et al, Nanotechnology, 15, 612 621, 2004). Movement distances with actuators such as these are possible even in the millimeter range (FPA 2000 model, movement distance 2.3 mm, Dynamic Structures & Materials Company. By way of example, the actuator 41 can be clamped in on the linear table by appropriate holders. A second holder now allows the scanning unit to be attached to the actuator 41 (not shown). This would make it possible to reduce the repositioning error to the nanometer or sub nanometer range.

LIST OF REFERENCE SYMBOLS

11 Base frame
12 Probe holder
13 Probe
14 Sample mount
15 Sample
16 Reaction chamber
17 Opening
18 Cover plate
20 Inlet
21 Outlet
22 Plasma generation device
23 Flat coil
24 Electrode
25 Electrode
26 Measurement table (xy stage)
27 Reaction chamber base body
28 Base plate (base frame)
29 Reaction chamber module
30 Capacitor
31 Closure device
32 Actuator
33 Lever arm
34 Waveguide
35 Microwave generation device
36 Conical attachment
37 Pin
38 Collar
39 Clamping devices
41 Actuator (for example in the form of a piezoactuator, piezo-flexure stage or magnetic xy scanner)
42 Micropositioning device
43 Scanning unit
44 Thread (or alternatively two threads)
45 Connection for vacuum or compressed air source
46 Cutout.

We claim:

1. A scanning probe microscope comprising:
a base frame, to which a probe holder with a probe as well as a sample mount are attached or can be attached, in which case the probe and the sample mount can be moved relative to one another in order to obtain information about the surface of the sample by scanning a sample which is arranged on the sample mount;
wherein a reaction chamber attached to the base frame of the scanning probe microscope, with the sample mount arranged in it, with the reaction chamber having an opening on its side facing the probe, through which the probe can enter the reaction chamber;
whereby the probe is moveable in a direction perpendicular to the investigation plane (xy plane) through a defined movement distance between a measurement position $P_M$ inside the reaction chamber and a withdrawn sample preparation position $P_V$ outside the reaction chamber;
whereby a closure device, in particular a cover or a cover plate, is provided in order to make it possible to close the opening of the reaction chamber after the probe has been moved from a measurement position $P_M$ to a withdrawn sample preparation position $P_V$; and
whereby the reaction chamber is adapted to enable a treatment of the surface of the sample within the reaction chamber when the reaction chamber is closed, particularly a treatment by the specific influence of fluids, particle flows, a plasma, and/or of electromagnetic, electrical and/or magnetic fields over a predetermined reaction time.

2. The scanning probe microscope as claimed in claim 1, wherein the movement distance of the probe relative to the sample is between 1 mm and 15 mm.

3. The scanning probe microscope as claimed in claim 1, wherein the movement distance of the probe relative to the sample is between 1 mm and 3 mm, and is produced by means of an actuator, in particular a piezoelectric actuator, a piezo flexure positioning apparatus or a magnetic xy scanner or positioning apparatus, which is advantageously arranged between a micropositioning device, which is arranged on the base frame and a scanning unit which is connected to the probe holder.

4. The scanning probe microscope as claimed in claim 1, wherein the reaction chamber also has an inlet, in order to introduce fluid media particle flows and/or a plasma into the reaction chamber, and particularly has an outlet, which is operatively connected to a suction device in order to pass liquids, gases, particle flows and/or plasmas via the inlet through the reaction chamber.

5. The scanning probe microscope as claimed in claim 1, wherein a plasma generation device, in particular designed to produce plasma by inductive means, is arranged on or in the reaction chamber in order to allow a plasma to be produced within the reaction chamber.

6. The scanning probe microscope as claimed in claim 1, wherein the reaction chamber has a volume of between 1 cm$^3$ and 300 cm$^3$.

7. The scanning probe microscope as claimed in claim 1, wherein a conductor is or can be passed into the reaction chamber in order to make contact with the sample.

8. A reaction chamber module for installation in a scanning probe microscope having the features as claimed in claim 1.

9. The reaction chamber module as claimed in claim 8, wherein the reaction chamber module essentially comprises the reaction chamber itself.

10. The reaction chamber module as claimed in claim 8, wherein the reaction chamber module comprises a reaction chamber base body as well as a reaction chamber.

11. A scanning probe microscope comprising:
a base frame, to which a probe holder with a probe as well as a sample mount are attached or can be attached, in which case the probe and the sample mount can be moved relative to one another in order to obtain information about the surface of the sample by scanning a sample which is arranged on the sample mount;
wherein a reaction chamber can be attached to the base frame of the scanning probe microscope, with the sample mount arranged in it, with the reaction chamber having an opening on its side facing the probe, through which the probe can enter the reaction chamber;
whereby the probe is moveable in a direction perpendicular to the investigation plane (xy plane) through a defined movement distance between a measurement position PM inside the reaction chamber and a withdrawn sample preparation position PV outside the reaction chamber;
whereby a closure device, in particular a cover or a cover plate, is provided in order to make it possible to close the opening of the reaction chamber after the probe has been moved from a measurement position PM to a withdrawn sample preparation position PV; and
whereby the reaction chamber is adapted to enable a treatment of the surface of the sample within the reaction chamber when the reaction chamber is closed, particularly a treatment by the specific influence of fluids, particle flows, a plasma, and/or of electromagnetic, electrical and/or magnetic fields over a predetermined reaction time;
wherein a plasma generation device, in particular designed to produce plasma by inductive means, is arranged on or in the reaction chamber in order to allow a plasma to be produced within the reaction chamber;
wherein:
the plasma generation device has a flat coil, in which all of the windings are arranged essentially on one plane, and a capacitor, which is formed radially symmetrically or in a planar form; and/or
the plasma generation device preferably is in the form of a miniaturized, integrated radiofrequency circuit and, in particular, is in a planar form; and/or
the plasma generation device is operatively connected to a plasma monitoring system, with whose aid the power required to ignite and/or to operate the plasma generation device is controlled.

12. A scanning probe microscope comprising:
a base frame, to which a probe holder with a probe as well as a sample mount are attached or can be attached, in which case the probe and the sample mount can be moved relative to one another in order to obtain information about the surface of the sample by scanning a sample which is arranged on the sample mount;
wherein a reaction chamber can be attached to the base frame of the scanning probe microscope with the sample mount arranged in it with the reaction chamber having an opening on its side facing the probe, through which the probe can enter the reaction chamber;
whereby the probe is moveable in a direction perpendicular to the investigation plane (xy plane) through a defined movement distance between a measurement position PM inside the reaction chamber and a withdrawn sample preparation position PV outside the reaction chamber;
whereby a closure device, in particular a cover or a cover plate, is provided in order to make it possible to close the opening of the reaction chamber after the probe has been moved from a measurement position PM to a withdrawn sample preparation position PV; and
whereby the reaction chamber is adapted to enable a treatment of the surface of the sample within the reaction chamber when the reaction chamber is closed, particularly a treatment by the specific influence of fluids, particle flows, a plasma, and/or of electromagnetic, electrical and/or magnetic fields over a predetermined reaction time;
wherein at least two electrodes of opposite polarity are provided on the reaction chamber, in order to input energy capacitively.

13. A scanning probe microscope comprising:
a base frame, to which a probe holder with a probe as well as a sample mount are attached or can be attached, in which case the probe and the sample mount can be moved relative to one another in order to obtain information about the surface of the sample by scanning a sample which is arranged on the sample mount;
wherein a reaction chamber can be attached to the base frame of the scanning probe microscope, with the sample mount arranged in it, with the reaction chamber having an opening on its side facing the probe, through which the probe can enter the reaction chamber;
whereby the probe is moveable in a direction perpendicular to the investigation plane (xy plane) through a defined movement distance between a measurement position PM inside the reaction chamber and a withdrawn sample preparation position PV outside the reaction chamber;

whereby a closure device, in particular a cover or a cover plate, is provided in order to make it possible to close the opening of the reaction chamber after the probe has been moved from a measurement position PM to a withdrawn sample preparation position PV; and whereby the reaction chamber is adapted to enable a treatment of the surface of the sample within the reaction chamber when the reaction chamber is closed, particularly a treatment by the specific influence of fluids, particle flows, a plasma, and/or of electromagnetic, electrical and/or magnetic fields over a predetermined reaction time;

wherein the closure device has an actuator which is driven hydraulically, pneumatically, or mechanically, and results in low friction movements of the cover plate, avoiding oscillations, and preferably results in movement of the cover plate, in particular in a rotational or translational movement.

14. A reaction chamber module for installation in a scanning probe microscope, wherein:

the reaction chamber module comprises a reaction chamber base body as well as a reaction chamber;

the reaction chamber module can be inserted into a measuring table, which can be moved in the investigation plane (xy plane), or forms an integral unit with the measurement table, in particular as an interchangeable module for a chuck; and the scanning probe microscope comprises:

a base frame, to which a probe holder with a probe as well as a sample mount are attached or can be attached, in which case the probe and the sample mount can be moved relative to one another in order to obtain information about the surface of the sample by scanning a sample which is arranged on the sample mount, wherein a reaction chamber can be attached to the base frame of the scanning probe microscope, with the sample mount arranged in it, with the reaction chamber having an opening on its side facing the probe, through which the probe can enter the reaction chamber, whereby the probe is moveable in a direction perpendicular to the investigation plane (xy plane) through a defined movement distance between a measurement position PM inside the reaction chamber and a withdrawn sample preparation position PV outside the reaction chamber, whereby a closure device, in particular a cover or a cover plate, is provided in order to make it possible to close the opening of the reaction chamber after the probe has been moved from a measurement position PM to a withdrawn sample preparation position PV, and whereby the reaction chamber is adapted to enable a treatment of the surface of the sample within the reaction chamber when the reaction chamber is closed, particularly a treatment by the specific influence of fluids, particle flows, a plasma, and/or of electromagnetic, electrical and/or magnetic fields over a predetermined reaction time.

15. A scanning probe microscope comprising:

a base frame, to which a probe holder with a probe as well as a sample mount are attached or can be attached, in which case the probe and the sample mount can be moved relative to one another in order to obtain information about the surface of the sample by scanning a sample which is arranged on the sample mount;

wherein a reaction chamber can be attached to the base frame of the scanning probe microscope with the sample mount arranged in it with the reaction chamber having an opening on its side facing the probe, through which the probe can enter the reaction chamber;

whereby the probe is moveable in a direction perpendicular to the investigation plane (xy plane) through a defined movement distance between a measurement position PM inside the reaction chamber and a withdrawn sample preparation position PV outside the reaction chamber;

whereby a closure device, in particular a cover or a cover plate, is provided in order to make it possible to close the opening of the reaction chamber after the probe has been moved from a measurement position PM to a withdrawn sample preparation position PV; and whereby the reaction chamber is adapted to enable a treatment of the surface of the sample within the reaction chamber when the reaction chamber is closed, particularly a treatment by the specific influence of fluids, particle flows, a plasma, and/or of electromagnetic, electrical and/or magnetic fields over a predetermined reaction time;

wherein a plasma is ignited and operated in the volume of the reaction chamber or in an adjacent chamber with a comparably large volume, in particular in a volume of 1 $cm^3$ to 10 $cm^3$.

16. A method for treatment and investigation of surfaces with the aid of a probe of a scanning probe microscope and of a reaction chamber which is installed in the scanning probe microscope, comprising the following steps:

a first scanning probe microscopic investigation of an area of a surface of a sample which is arranged in an open reaction chamber is carried out;

the probe is withdrawn in a direction perpendicular to the investigation plane (xy plane), through a defined movement distance S from its measurement position $P_M$ to a sample preparation position $P_V$;

the reaction chamber is closed;

after closing the reaction chamber the surface within the reaction chamber is treated by the specific influence of fluids particle flows, a plasma and/or of electromagnetic, electrical and/or magnetic fields over a predetermined reaction time;

the reaction chamber is opened again in order to allow the probe to enter the reaction chamber;

after opening the reaction chamber the probe is moved back from the sample preparation position $P_V$ to the previous measurement position $P_M$ or to a new initial position $P_A$ in the direct vicinity of the previous measurement position.

17. The method as claimed in claim 16, wherein the relevant movement between the probe and the sample is carried out such that the previous measurement position $P_M$ and the new initial position $P_A$ are less than 600 nm apart from one another.

18. The method as claimed in claim 16, wherein the previous measurement position $P_M$ and the initial position $P_A$ are less than 0.04 parts per thousand, and the approximately constant increase in the distance for further treatment steps preferably increases by less than about 0.0035 parts per thousand.

19. The method as claimed in claim 16, wherein the method steps are carried out automatically with the aid of computer control.

* * * * *